Oct. 22, 1963
J. PALFREYMAN
3,107,489
GAS TURBINE ENGINE
Filed Nov. 14, 1960
3 Sheets-Sheet 1
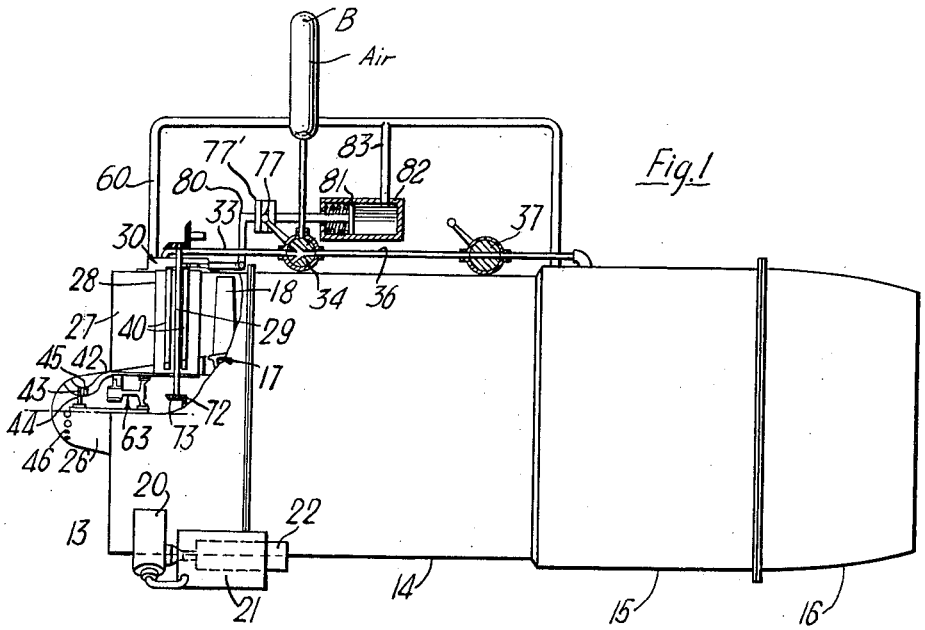
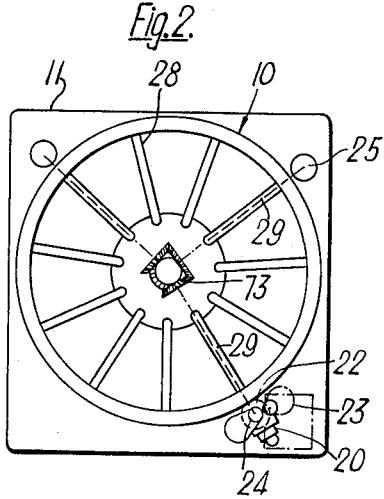
Jack Palfreyman, Inventor
By
Fred. E. Shoemaker and
Fred L. Witherspoon, Jr. Attorneys

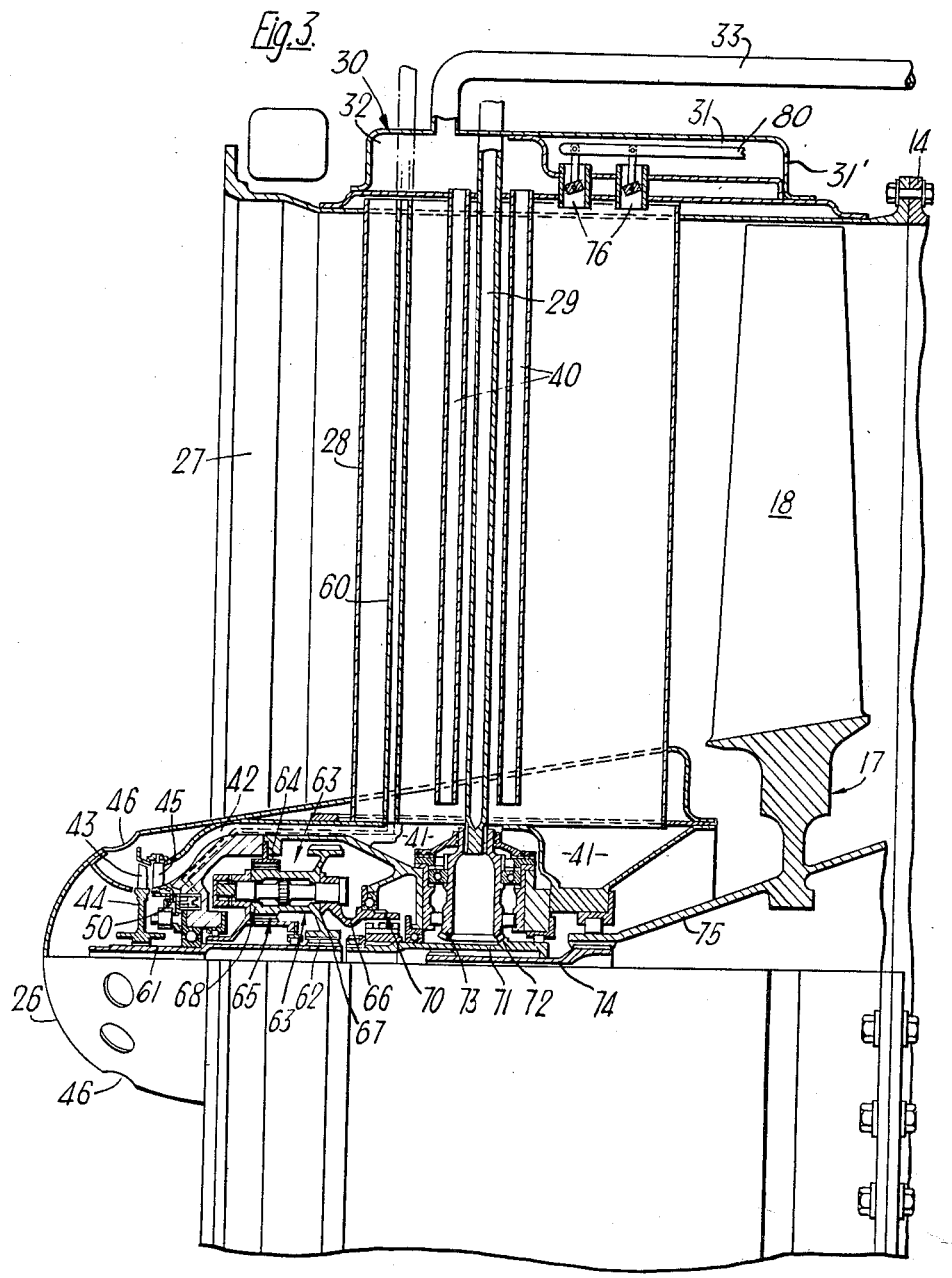

Oct. 22, 1963 J. PALFREYMAN 3,107,489
GAS TURBINE ENGINE
Filed Nov. 14, 1960 3 Sheets-Sheet 3
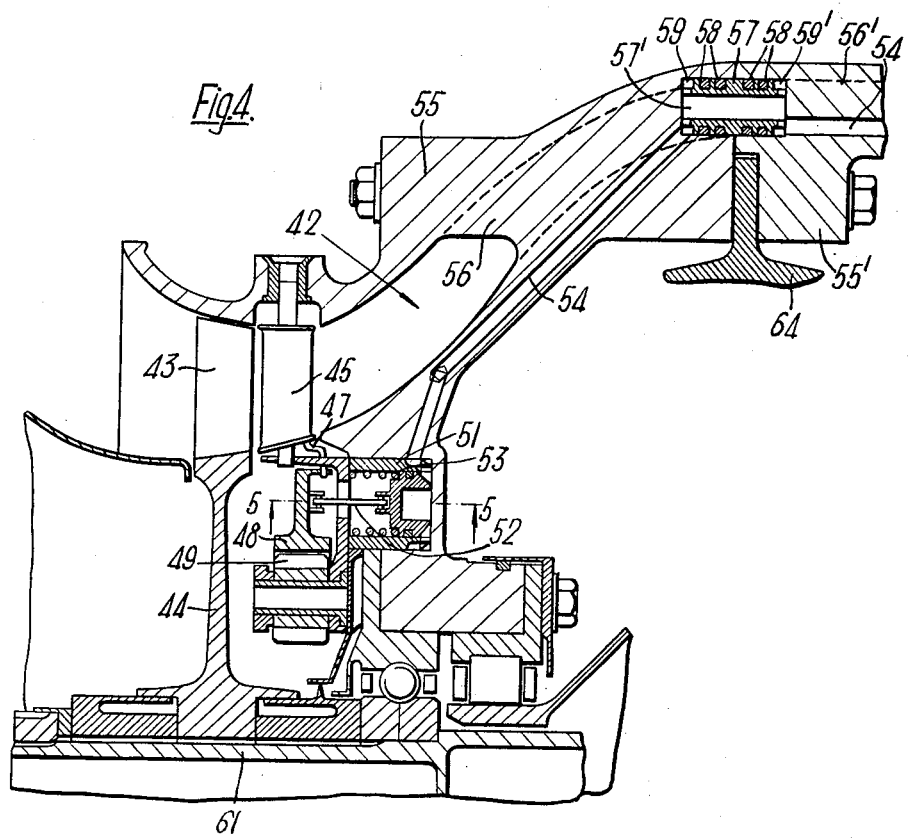
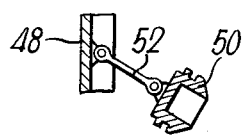
Jack Palfreyman, Inventor
By
Fred. E. Shoemaker and
Fred L. Witherspoon, Jr. Attorneys

United States Patent Office 3,107,489
Patented Oct. 22, 1963

3,107,489
GAS TURBINE ENGINE
Jack Palfreyman, Tansley, near Matlock, England, assignor to Rolls-Royce Limited, Derby, England, a company of Great Britain
Filed Nov. 14, 1960, Ser. No. 68,961
Claims priority, application Great Britain Nov. 26, 1959
9 Claims. (Cl. 60—39.14)

This invention concerns gas turbine engines.

According to the present invention there is provided a gas turbine engine comprising a starter turbine for effecting starting of the engine, ducting for supplying a motive fluid to said starter turbine so as to effect rotation of the latter, and means for connecting said ducting selectively to a source of the said motive fluid and to a source of heated air, said ducting being in heat exchange relationship with surfaces forming part of the engine air intake so that when the ducting is supplied with the said heated air, ice formation on the said surfaces will be prevented.

Preferably the means for connecting the ducting selectively to a source of the said motive fluid and to a source of heated air comprises a change-over valve and means responsive to an engine operating variable for effecting change-over of the valve when the said engine operating variable reaches a predetermined value.

Blocking means may be provided for preventing the said motive fluid from passing through the starter turbine when an engine operating variable has reached a predetermined value.

The blocking means may comprise inlet guide vanes of the starter turbine, said inlet guide vanes being disposed in said ducting, and means being provided for moving the inlet guide vanes between open and closed positions. Thus the means for moving the inlet guide vanes may comprise a pressure responsive device which is acted on in a vane closing direction by an engine operating pressure (e.g. compressor delivery pressure) and which is acted on in a vane opening direction by resilient means.

The said surfaces preferably comprise those of hollow struts which extend radially of the air intake, said struts supporting from the engine casing a housing which defines with the casing an annular intake portion of the main fluid duct of the engine, the said ducting passing through said hollow struts and comunicating with the interior thereof. The starter turbine is preferably mounted in said housing.

The interiors of said struts may communicate with the atmosphere by way of normally closed valves, means being provided for maintaining said valves open whenever heated air is supplied to the said interiors.

The said heated air is preferably air which has been heated by being compressed in the compressor of the engine.

The invention is illustrated, merely by way of example, in the accompanying drawings, in which:

FIGURE 1 is a diagrammatic side elevation, partly in section, of a gas turbine engine according to the present invention, FIGURE 2 is a front elevation of the gas turbine engine shown in FIGURE 1, FIGURE 3 is an enlarged view, partly in section, of a portion of the gas turbine engine shown in FIGURE 1, FIGURE 4 is an enlarged sectional view of a portion of the structure shown in FIGURE 3, and FIGURE 5 is a section taken on the line 5—5 of FIGURE 4.

Referring to the drawings, a gas turbine, jet propulsion, engine 10 for an aircraft (e.g. a supersonic aircraft) is mounted within a substantially rectangular housing 11. The housing 11 may be mounted on top of the fuselage (not shown) or on top of a wing (not shown) of an aircraft.

The engine 10 has a casing comprising a front or air intake portion 13, central portions 14, 15, and a rear or jet pipe portion 16. A compressor 17 is mounted mainly within the portion 14 but has its inlet guide vanes 18 disposed within the front casing portion 13. The casing portion 15 houses combustion equipment (not shown) and a turbine (not shown).

Mounted externally on the front casing portion 13 are a number of engine auxiliary devices and other equipment including a centrifugal fuel pump 20, a filter and oil cooler 21, a fuel control unit 22, a backing pump 23, an emergency governor 24, and a pair of hydraulic pumps 25 arranged back to back. It will be noted from FIGURE 2 that these auxiliary devices and other equipment are disposed in the corners of the rectangular housing 11 where there is the most room for them.

The front casing portion 13, which carries the said engine auxiliary devices, is bolted to the casing portion 14 and may therefore readily be detached therefrom. Accordingly the front casing portion 13, together with the engine auxiliary devices, may be completely removed from the rest of the engine whereby to facilitate rig testing of the auxiliary devices.

Mounted within the front casing portion 13 is a bullet-shaped engine front bearing housing 26. The latter defines with the front casing portion 13 an annular intake portion of the main fluid flow passage 27 of the engine. The housing 26 is supported from the front casing portion 13 by a plurality of angularly spaced apart hollow struts 28 which extend radially of the passage 27. Quill-shafts 29, which are employed for transmitting drive from the compressor 17 to the engine auxiliary devices, extend through certain of the struts 28.

Mounted externally on the front casing portion 13 is an annular manifold 30 which is divided into compartments 31, 32 (FIGURE 3). The compartment 32 communicates with an air duct 33, the air duct 33 selectively communicating via a change-over valve 34 with ducts 35, 36. The duct 35 is adapted to be connected to a compressed air bottle B (not shown) or any other source of compressed air—e.g. a ground running compressor. The duct 36 communicates via a shut-off cock 37 with the delivery end of the engine compressor 17.

Mounted within each of the hollow struts 28 so as to extend longitudinally thereof is a pair of tubes 40 which are open at their opposite ends, the radially outer ends of the tubes 40 communicating with the manifold 32. The radially inner ends of the tubes 40 communicate with an annular chamber 41 which is disposed in the housing 26, the chamber 41 being arranged to supply air via an annular passage 42 to the turbine blades 43 of an air-driven starter turbine 44.

The turbine 44 has pivotally mounted inlet guide vanes 45 which are disposed in the passage 42, the vanes 45 being movable between an open position in which air may be directed through the passage 42 and onto the blades 43, and a closed position in which they close off the passage 42. Air which has passed through the turbine 44 may escape to atmosphere through holes 46 in the housing 26.

The vanes 45 are connected by cranked arms 47 (FIGURE 4) to a vane operating ring 48 which is mounted on roller bearings 49, rotation of the ring 48 in opposite angular senses moving the vanes 45 between their open and closed positions respectively.

Such rotation of the vane operating ring 48 is effected by a plurality of pistons 50 which work within cylinders 51, the pistons 50 being pivotally connected to the rings 48 by connecting rods 52. The pistons 50 are urged by springs 53 towards the position shown in FIGURE 4 in which they are disposed at the ends of their cylinders 51 remote from the vanes 45, this position corresponding to the open position of the vanes 45. The said ends of the cylinders 51, are, however, open via passages 54 to the delivery pressure of the compressor 17, the arrangement being such that, when this pressure reaches a predetermined value, the pistons 50 are moved against the action of the springs 53 so as to effect closure of the vanes 45.

The passage 42 extends through casing portions 55, 55' which are bolted together. A series of webs 56, 56', forming part of the casing portions 55, 55' respectively, extend across the passage 42, each pair of webs 56, 56' being provided with aligned blind holes in which is mounted a bobbin 57. The bobbin 57 is sealed to the casing portions 55, 55' by sealing rings 58 and is provided at its opposite ends with annular chambers 59, 59' which respectively communicate with those parts of the passages 54 extending through the casing portions 55, 55'. The bobbin 57 has a longitudinal passage 57' therethrough which communicates with the annular chambers 59, 59'. Thus air passing through the passages 54 is prevented from leaking through the joint between the casing portions 55, 55'.

The passages 54 communicate with tubes 60 which extend through the struts 28 and which are connected to casing portion 15 so as to be supplied with compressor delivery air.

The starter turbine 44 is splined onto a shaft 61 onto which is splined a sun gear 62 (FIGURE 3) of an epicyclic gear train 63. The gear train 63 comprises a fixed annulus gear 64 and a plurality of planet gears 65, the latter being carried by a planet carrier 66. Each of the planet gears 65 has at one end a gear 67 which meshes wtih the sun gear 62 and, at the other end, a gear 68 which meshes with the fixed annulus gear 64.

The planet carrier 66 is provided with one portion of a free-wheel device 70, the other portion of the free-wheel device being carried by a shaft 71. The free-wheel device is so arranged that drive may be transmitted therethrough from the planet carrier 66 to the shaft 71 but not vice versa.

The shaft 71 is provided with a bevel gear 72 with which mesh bevel gears 73 at the inner ends of the quillshafts 92. The shaft 71 has a splined connection with a shaft 74 which in turn is splined to the rotor shaft 75 of the compressor 17. Drive imparted to the shaft 71 from the planet carrier 66 is therefore transmitted both to the said engine auxiliary devices and to the compressor 17.

The interiors of the struts 28 communicate with the compartment 31 by way of valves 76 of the butterfly type as shown, the compartment 31 being vented to atmosphere through an aperture 31'. Between the change-over valve 34 and the valve 76, there is a mechanical connection indicated diagrammatically at 80 (FIGURES 1 and 3) which insures that the valves 76 are open when the change-over valve 34 establishes communication between the ducts 33, 36, and are shut when the changeover valve 34 establishes communication between the ducts 33, 35.

The changeover valve 34 is shown diagrammatically as being movable between its two positions by a spring-biased piston 81 slidably mounted in a cylinder 82 which is connected at 83 to one of the tubes 60, the piston 81 being directly connected to the mechanical connection 80, and both the piston 81 and connection 80 being connected to valve operating lever 77 by a transverse slide device 77', whereby reciprocation of piston 81 is translated into pivoting movement of lever 77. The changeover valve 34 is normally urged by the spring-biased piston 81 towards the position in which the ducts 33, 35 intercommunicate, but when the operation of the engine has become self-sustaining, i.e. when the use of the starter turbine is no longer required the compressor builds up the pressure in the cylinder 82 so that the changeover valve 34 is moved to the position shown in FIGURE 1.

In operation, the engine is started by connecting the duct 35 to the said compressed air bottle or other source of compressed air. The changeover valve 34 will permit the compressed air to flow from duct 35 into the duct 33 and so via the compartment 32, tubes 40, chamber 41 and passage 42 to the blades 43 of the starter turbine 44. The valves 76 will at this stage be shut but the air will finally escape to atmosphere via the holes 46 in the housing 26. When the engine is being started, the vanes 45 will be in their open position since there will be, initially, no compressor delivery pressure acting on the pistons 50.

The starter turbine 44 will therefore be driven by the compressed air and in turn will drive the shaft 71 via the epicyclic gear train 63 and free wheel device 70. The drive transmitted to the shaft 71 will be imparted both to the engine auxiliary devices via the gears 72, 73 and quillshafts 29, and to the rotor shaft 75 of the compressor 17 via the shaft 74.

The air compressed by the compressor 17 will be supplied to the engine combustion equipment (not shown) and so to the engine turbine (not shown) so as to drive the latter. The engine turbine is arranged to drive the compressor 17 and when the operation of the engine has become self-sustaining the compressor 17 will be driven faster by the engine turbine than by the starter turbine 44. The free-wheel device 70, however, prevents the engine turbine from driving the strater turbine.

Once the operation of the engine has become self-sustaining, the compressor delivery pressure acting on the pistons 50 will be such as to move the pistons against their springs 53. The vanes 45 will therefore be moved to the closed position so as to block off the passage 42. At the same time, the said spring-biased piston 81 will move the changeover valve 34 to the position shown in FIGURE 1 and the valves 76 will be opened (FIGURE 3).

If during operation of the engine it is desired to heat various parts of the engine to prevent the formation of ice thereon, the shut-off cock 37 is moved to the position shown in FIGURE 1 in which air that has been heated by being compressed in the compressor 17 will be allowed to flow via the ducts 36, 33 and compartment 32 into the tubes 40. The heated compressor delivery air will then flow from the inner ends of the tubes 40 and through the interior of the struts 28 to the valves 76, compartment 31, aperture 31', and so to atmosphere. This flow of heated air will pass over the leading edges of the struts 28 so as to prevent the formation of ice thereon. The heated air will also fill the passage 42 up to the vanes 45 and will therefore prevent formation of ice on the housing 26.

If desired, the tubes 40 may be provided with apertures (not shown) so that the heated air may be caused to impinge directly on the leading surfaces of the struts 28. It will be appreciated that the heated air cannot exhaust to atmosphere through the starter turbine blades 43 and holes 46 as the vanes 45 will then be in the position in which they block-off the passage 42. If desired the changeover valve 34 may be operated by a speed-sensitive or a temperature-sensitive device, instead of the pressure-sensitive device comprising the components 81, 82 and 83. It will be noted that the pressure-sensitive device for operating the changeover valve 34 is similar to the pressure-sensitive device shown in FIGURES 4 and 5 for operating the vane control ring 48.

I claim:

1. A gas turbine engine having an air intake comprising an air intake casing, and a nose bullet located centrally of the air intake casing and defining an air intake passageway therewith, said air intake having surfaces on which ice may form, a starter turbine located in said nose bullet for effecting starting of the engine, a source of motive fluid for the starter turbine, a separate source of heated air, at least one duct which extends between said air intake casing and said nose bullet, means for connecting said at least one duct at the end thereof in said air intake casing selectively to said motive fluid source and to said heated air source, heating duct means in heat exchange relationship with said surfaces of the air intake, said heating duct means and said starter turbine being separate from one another and both being in common communication with said at least one duct at the end thereof in said nose bullet, first closure means associated with said starter turbine for selectively closing and opening the starter turbine to fluid flow therethrough, and second closure means associated with said heating duct means for selectively closing and opening the heating duct means to fluid flow therethrough to the atmosphere.

2. A gas turbine engine as claimed in claim 1 in which said means for connecting said at least one duct at the end thereof in said air intake casing selectively to said motive fluid source and to said heated air source comprises a changeover valve responsive to an engine operating variable, said changeover valve being constructed to connect said at least one duct to said motive fluid source when the engine is in a non-started condition, and connecting said at least one duct to said heated air source when the engine has been started and said engine operating variable has reached a predetermined value.

3. A gas turbine engine as claimed in claim 2 in which said changeover valve is operatively connected to said second closure means so that when the changeover valve connects said at least one duct to said motive fluid source, said second closure means closes said heating duct means to fluid flow therethrough to the atmosphere, and when the changeover valve connects said at least one duct to said heated air source, said second closure means opens said heating duct means to fluid flow therethrough.

4. A gas turbine engine as claimed in claim 1 in which said heated air source includes a pipe connected to receive air which has been heated by being compressed by the engine.

5. A gas turbine engine having an air intake comprising an air intake casing, and a nose bullet located centrally of the air intake casing and defining an air intake passageway therewith, said air intake having surfaces on which ice may form, a starter turbine located in said nose bullet for effecting starting of the engine, a source of motive fluid for the starter turbine, a separate source of heated air, at least one duct which extends between said air intake casing and said nose bullet, means for connecting said at least one duct at the end thereof in said air intake casing selectively to said motive fluid source and to said heated air source, heating duct means in heat exchange relationship with said surfaces of the air intake, said heating duct means and said starter turbine being separate from one another and both being in common communication with said at least one duct at the end thereof in said nose bullet, first closure means associated with said starter turbine, control means responsive to an engine operating variable for operating said first closure means, said control means closing said first closure means to close the starter turbine to fluid flow therethrough when said engine operating variable reaches a predetermined value, and second closure means associated with said heating duct means for selectively closing and opening the heating duct means to fluid flow therethrough to the atmosphere.

6. A gas turbine engine having an air intake comprising an air intake casing, and a nose bullet located centrally of the air intake casing and defining an air intake passageway therewith, said air intake having surfaces on which ice may form, a starter turbine located in said nose bullet for effecting starting of the engine, a source of motive fluid for the starter turbine, a separate source of heated air, at least one duct which extends between said air intake casing and said nose bullet, means for connecting said at least one duct at the end thereof in said air intake casing selectively to said motive fluid source and to said heated air source, heating duct means in heat exchange relationship with said surfaces of the air intake, said heating duct means and said starter turbine being separate from one another and both being in common communication with said at least one duct at the end thereof in said nose bullet, inlet guide vanes forming part of said starter turbine, means responsive to an engine operating variable for moving said inlet guide vanes between open and closed positions, said last-mentioned means moving the inlet guide vanes to the closed position in which they close the starter turbine to fluid flow therethrough when said engine operating variable reaches a predetermined value, and closure means associated with said heating duct means for selectively closing and opening the heating duct means to fluid flow therethrough to the atmosphere.

7. A gas turbine engine having an air intake comprising an air intake casing, and a nose bullet located centrally of the air intake casing and defining an air intake passageway therewith, said air intake having surfaces on which ice may form, a starter turbine located in said nose bullet for effecting starting of the engine, a source of motive fluid for the starter turbine, a separate source of heated air, at least one duct which extends between said air intake casing and said nose bullet, means for connecting said at least one duct at the end thereof remote from said nose bullet selectively to said motive fluid source and to said heated air source, heating duct means in heat exchange relationship with said surfaces of the air intake, said heating duct means and said starter turbine being separate from one another and both being in common communication with said at least one duct at the end thereof in said nose bullet, inlet guide vanes forming part of said starter turbine, pressure responsive means for moving said inlet guide vanes between open and closed positions, resilient means acting on the pressure responsive device in a vane opening direction, means for applying to said pressure responsive device an engine operating pressure, said pressure acting to move the inlet guide vanes towards a closed position in which they prevent fluid flow through said starter turbine, and closure means associated with said heating duct means for selectively closing and opening the heating duct means to fluid flow therethrough to the atmosphere.

8. A gas turbine engine having an air intake comprising an air intake casing, and a nose bullet located centrally of the air intake casing and defining an air intake passageway therewith, said air intake having surfaces on which ice may form, a compressor, a starter turbine located in said nose bullet for effecting starting of the engine, a free-wheel device, the starter turbine being drivingly connected to the compressor by way of the free-wheel device, and the free-wheel device preventing the starter turbine being driven by the compressor, a source of motive fluid for the starter turbine, a separate source of heated air, at least one duct which extends between said air intake casing and said nose bullet, means for connecting said at least one duct at the end thereof in said air intake casing selectively to said motive fluid source and to said heated air source, heating duct means in heat exchange relationship with said surfaces of the air intake, said heating duct means and said starter turbine being separate from one another and both being in common communication with said at least one duct at the end thereof in said nose bullet, first closure means associated with said starter turbine for selectively closing and opening the starter turbine to fluid flow therethrough, and second closure means associated with said heating duct means for selectively closing and opening the heating duct means to fluid flow therethrough to the atmosphere.

9. A gas turbine engine having an air intake comprising an air intake casing, a nose bullet located centrally of the air intake casing and defining an air intake passageway therewith, and a plurality of angularly spaced apart hollow struts which extend radially between the air intake casing and the nose bullet and which have external surfaces on which ice may form, a starter turbine located in said nose bullet for effecting starting of the engine, a source of motive fluid for the starter turbine, a separate source of heated air, at least one duct which extends between said air intake casing and said nose bullet within one of said hollow struts, means for connecting said at least one duct at the end thereof in said air intake casing selectively to said motive fluid source and to said heated air source, heating duct means in heat exchange relationship with said external surfaces, said heating duct means and said starter turbine being separate from one another and both being in common communication with said at least one duct at the end thereof in said nose bullet, first closure means associated with said starter turbine for selectively closing and opening the starter to fluid flow therethrough, and second closure means associated with said heating duct means for selectively closing and opening the heating duct means to fluid flow therethrough to the atmosphere.

References Cited in the file of this patent

UNITED STATES PATENTS

| | | |
|---|---|---|
| 2,482,791 | Nettel et al. | Sept. 27, 1949 |
| 2,594,118 | Boyd | Apr. 22, 1952 |
| 2,840,987 | Bloomberg | July 1, 1958 |
| 2,851,863 | Theed | Sept. 16, 1958 |
| 2,874,540 | Esmeier | Feb. 24, 1959 |
| 2,920,447 | Hollings | Jan. 12, 1960 |
| 2,959,918 | West | Nov. 15, 1960 |

FOREIGN PATENTS

| | | |
|---|---|---|
| 798,704 | Great Britain | July 23, 1958 |